United States Patent [19]

Hopkins

[11] 4,265,199

[45] May 5, 1981

[54] METHOD AND APPARATUS TO ASSIST IN PROVOKING FORWARD MOVEMENT OF ANIMALS

[75] Inventor: Donald L. Hopkins, Heywood, Australia

[73] Assignee: Alf Hannaford & Co. Pty. Ltd., Beverley, Australia

[21] Appl. No.: 2,469

[22] Filed: Jan. 10, 1979

[30] Foreign Application Priority Data

Jan. 10, 1978 [AU] Australia ............... PD2989

[51] Int. Cl.³ ............................................ A01K 15/00
[52] U.S. Cl. .................................................... 119/29
[58] Field of Search ............... 119/27, 28, 29, 82; 256/10, 14; 231/2 R

[56] References Cited

U.S. PATENT DOCUMENTS 2,512,740 6/1950 Evans ........................ 256/10
2,899,174 8/1959 Wells ......................... 256/10
3,827,402 8/1974 Laurenz .................... 119/28 X

FOREIGN PATENT DOCUMENTS 1274197 5/1972 United Kingdom ............ 119/29

Primary Examiner—Robert Peshock
Assistant Examiner—Robert P. Swiatek
Attorney, Agent, or Firm—Oldham, Oldham, Hudak & Weber Co.

[57] ABSTRACT

Apparatus and a method for provoking forward movement of animals especially sheep comprising an electrode above a conducting floor located so as to engage a rear of the leg of the animal between a hock and the hoof, and a voltage generating mechanism to apply substantial voltage which is found to provoke such forward movement. The invention also includes an insulating cover for the electrodes which can be resiliently diverted when a sheep backs into it.

9 Claims, 3 Drawing Figures

U.S. Patent
May 5, 1981
4,265,199
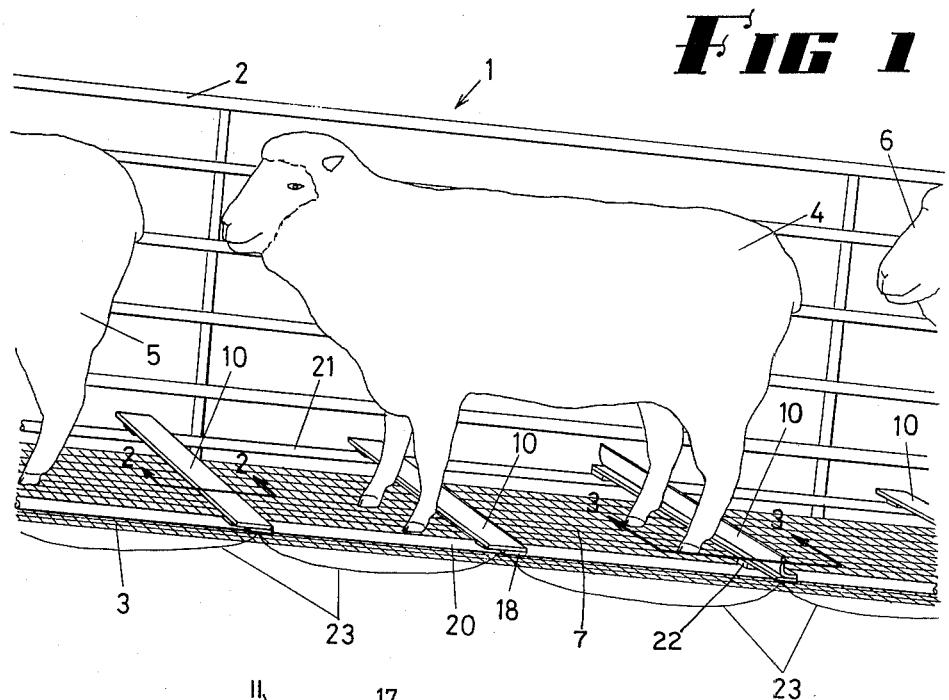
*Fig 1*
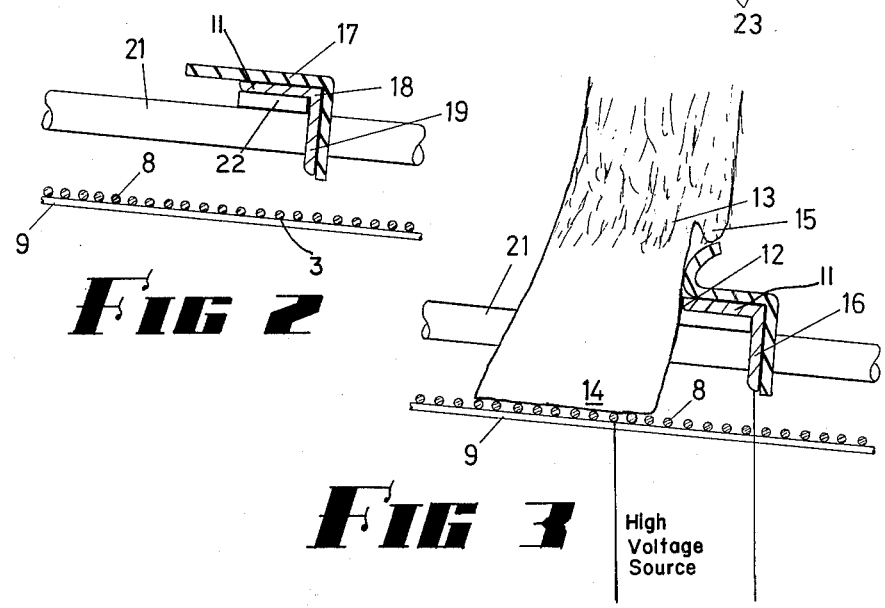
*Fig 2*
*Fig 3*
High Voltage Source

METHOD AND APPARATUS TO ASSIST IN PROVOKING FORWARD MOVEMENT OF ANIMALS

This invention relates to both the method and to an arrangement having the purpose of assisting in provoking forward movement of animals especially sheep.

BACKGROUND OF THIS INVENTION

The difficulty of having sheep move in a selected path and especially along a chute is very well known and extensively documented.

Many reasons have been put forward as to why sheep will not willingly move forwardly in a chute, but it is now well known that they will sometimes attempt almost impossible actions to withdraw from a chute for no apparent reason and, certainly, to have a sheep willingly move along a chute would be of considerable assistance to all who need to handle sheep.

I have previously proposed an arrangement that has had some considerable value which is in the form of a barrier which is held in such a way that a sheep, perhaps by curiosity, will tend to look thereunder and will upon such action lift the barrier and the barrier will gently rest upon the sheep, first its head, and thereafter its back, and interestingly, when the sheep turns to look behind, its view will thereafter be blocked by the barrier.

This device has had considerable value.

However, while this device does assist, it will not in itself cause the sheep to move forwardly along a chute and especially will not activate these upon any selected action by an operator.

OBJECT OF THIS INVENTION

An object of this invention is to propose, at least in one form, an arrangement which can be both economical and in fact practical in use and which can be used to more adequately assist in provoking forward movement of sheep especially when these are in a chute.

It is a further object of at least one aspect of this invention to provide a method which will assist in provoking forward movement of animals especially sheep.

A further object of at least one aspect of the invention is to propose apparatus which can be both very economic and very practical and especially not prone to breakdown in very harsh environmental conditions.

CONCEPT OF THIS INVENTION

It has generally been hitherto considered that electric probes which are known for instance in the handling of pigs and cattle are not of value in relation to the handling of sheep since the thickness of the wool and the characteristics of the wool are such that it is most difficult to gain good contact with a vulnerable portion of the animal.

While studying sheep I have observed, that while they are waiting in a chute, there is a tendency for the sheep to edge backward and especially their back feet move back with limited short shuffling steps.

They will perform such motions generally until stopped by a barrier across the chute floor and this, therefore, invites the further form of this invention which comprises very simply a fixed electrode located at the appropriate distance above the floor of the chute and while having a portion forwardly projecting, has a resilient portion above the electrode which both covers the electrode and is further forwardly projecting and is arranged so that with the rearward shuffling action of a sheep, the resilient insulating cover of the electrode is deflected and the rear appropriate portion of the leg of a sheep comes into contact with the fixed electrodes forward projecting portion.

After considerable work and experiments, I has found that there is one general area on a sheep which is also appropriately placed for the function required, and that is vulnerable to the application of an electrical voltage for provocation of the animal.

This area is at the lower portion of each leg, and especially behind the leg and generally between the hock and the hoof.

The voltage that I have found effective is the same as commonly used in relation to electric fences used as a deterrent for cattle and especially in a preferred instance, I have provided a return path through the hoof of the animal standing on a conducting return electrode.

While this information is of some importance, there are further difficulties however in proposing an arrangement which can effectively use this discovery, considering the most difficult environmental conditions and the needs of any operator when handling sheep.

For instance, in the use of any fixed electrode system, such a system must not be vulnerable to sheep stepping on, over, and around the specific apparatus and preferably the apparatus should not provoke sheep unless required by the operator.

It then must be effective in provoking the movement of the sheep in a forward direction, otherwise, of course, its purpose is completely voided.

Further, of course the apparatus must be capable of withstanding being covered with excreta and urine if it is to be located below the involved particular anatomical portions of the animals.

Accordingly, the invention in one form can be said to reside in an arrangement to assist in provoking forward movement of sheep including a floor on which a sheep is to walk, and at least one electrically conductive member located above the floor at a height located approximately between a hoof and hock at the rear of a lower portion of the leg of a sheep, the member extending across the proposed forward path of the sheep, and second electrode means either constituted by a portion of the floor or a member in adjacent vicinity of the first set of electrodes and adapted to contact a lower rear portion of the leg of the sheep, and means connected to the two said electrodes to selectively apply a substantial voltage therebetween sufficient to provoke forward movement of the sheep.

The above statement conceives the use both of a fixed electrode or a movable electrode so that the electrode itself, by an adjustable support, can be brought up against the rear of the leg of the sheep.

It also includes the concept of two electrodes, perhaps one above the other but in sufficiently close relationship and preferably resiliently held so that the rear portion of the leg of a sheep will contact both electrodes and maintain adequate contact thereto while any sufficient voltage is applied to provoke forward movement of the sheep.

In fact, if a sheep is being handled at a forwardmost end of a chute, there can be means activated by a gate or other mechanism which can, upon appropriate initiation, activate the application of the sufficient voltage to then automatically cause the sheep to move forwardly under this provocation.

The above also contemplates the use of insulation above and around such electrodes so that they will not be effective to act against the sheep except upon the specific requirement of an operator and especially so that an operator can himself walk along the chute without danger of being electrically shocked.

While reference has generally been made to apparatus, it will be equally appreciated that the invention could reside in the method which is constituted by the steps of for the purpose of provoking forward movement of sheep, selectively applying to spaced apart portions of electrically transmittable parts of a sheep, one part of which is behind the lower portion of the leg at or below the hock, a sufficient voltage to provoke such forward movement of the animal.

The method could be further incorporated in the above steps especially when there is a floor upon which the sheep are supported and the floor constitutes one electrode by which the underneath of the hoof then provides one electrically transmittable portion of the sheep.

The invention could in a further form reside in an apparatus for provoking the forward movement of sheep which apparatus comprises a race, an electrically conductive grid constituting the floor of the race, a plurality of electrodes in spaced apart locations along the race and positioned to provide a forwardly projecting portion generally between the hock and the hoof of the leg of the sheep, insulation above the electrode which insulation is resiliently held in a forwardly projecting position beyond the forwardmost portion of the respective electrode, which insulation is arranged so that with a sheep backing its leg into the electrode, the insulation will be deflected to allow contact of the electrode with the said rear portion of the leg of the sheep, and means to provide a sufficient voltage to said floor and the electrode to effect such forward movement provocation, and means to selectively apply such voltage to said electrodes.

The specific problem best answered by this invention relates to sheep firstly because of the abovementioned difficulty of applying portable probes to sheep and secondly because of the psychological characteristics of the animal.

It is however, appreciated that with such a simple system as electrodes located across a chute (or race) there can be some value in applying such a system to some other animals although it is generally conceded that the need would seem somewhat less in relation to other animals.

The invention will be better understood with a description of a preferred embodiment which shall now be described with the assistance of drawings which are attached hereto and in which:

FIG. 1 is a perspective view of sheep located in a race with the barricade on one side removed to show more clearly the arrangement, FIG. 2 is a cross sectional view along the lines 2—2 as shown in FIG. 1 especially showing the electrodes and the insulation above the upper electrode, and FIG. 3 is a cross sectional view along the lines 3—3 in FIG. 1 especially showing the position of the lower back leg of the sheep and manner in which the resilient insulation is deflected.

Referring now in detail to the drawings, there is shown, a race 1 including sides 2 and a floor 3 along and up which sheep as shown 4, 5 and 6 are expected to move forwardly.

The floor 3 includes a wire mesh 7 which is comprised of wires 8 extending in a crossing direction across the race 1 and longitudinal wires 9 which extend in the direction of the race 1.

The distance between the respective crossing wires 8 is such as to provide adequate and sure footing for the animals intended to be supported thereon, but to also allow for passage therethrough of any excreta or urine that might be deposited by the animals.

The actual distance in practice can very easily be decided.

The floor 3 constitutes a first electrode and is a common conductor throughout its length.

The second electrode is constituted by a plurality of members 10 which are located in crossing relationship across the floor 3 and are raised so that there is a forwardly projecting portion 11 which is located in practice $1\frac{1}{2}$ inches above an upper surface of the floor 3.

Such distance is selected so that the forward edge 12 is about a height so that when a leg 13 with the hoof 14 is resting on the floor 3 then such a height would be somewhat midway between the hock 15 and the hoof 14.

It is in this general area of the leg of the sheep that it has been found that there is good sensitivity to provocation from electrical voltage and fairly obviously, the height of the electrode can be varied within modest limits without departing from the concept of this general invention although the embodiment as presently being described uses $1\frac{1}{2}$ inches as the optimum height.

Each electrode 10 further includes a downwardly extending portion 16 which provides substantial strength against deflection when stepped on by an animal or man.

Above the electrode portion 11 is a flexible rubber sheet 17 which is vulcanized onto the outer face 18 of the electrode 10 so that on the top edge the rubber is held firmly thereto and projects forwardly a distance of approximately one-half inch and on the rear edge 19 is downwardly deflected so as to protect the forward portion of any legs of the sheep against accidental electric shocks.

The electrodes 10 in each case are supported on each side by common longitudinal members 20 and 21 on which the ends of the electrodes rest, being separated therefrom however by insulators 22.

Wires 23 commonly connect each of the electrodes together and to the means for generating a high voltage. Such means are well known and are conventionally used to deter cattle and other animals animals from passing through a fence generally termed "an electric fence".

Such voltages and currents as have been used in this application have on our experimentations been quite adequate for the purposes of this particular invention.

In use, sheep are led into the race 1 and while standing in the race are found to back with small shuffling steps so that the back of their back legs especially will engage against the forwardly projecting portion of the electrode 10.

Perhaps even more importantly, the flexible rubber 17 is deflected backwardly and upwardly to assist in exposure of the conducting portion of the electrode and this then makes an effective circuit between the floor 3 and the rear leg portion of the animal especially between the hock and the hoof of the animal.

The method then includes the steps of making or breaking a switch not shown to effect a high voltage impulse between the respective electrodes 11 and 3 and it is found that the animals, especially sheep, will then be provoked into forward movement.

The arrangement described has significant advantages in that firstly being protected from above by an insulating cover.

It is even generally insulated from the deposit of such materials as straw or other debris and in practice has been found to provide very good results.

Indeed, for the first time, it is believed in a very simple manner, animals such as sheep, and indeed especially sheep can now be provoked with a minimum of effort by any operator into a forward movement along a race (or chute) especially where there is a rising angle which assists in provoking such rearward shuffling movement of the sheep.

Hence, the concept of the invention can be applied with respect to two electrodes held in the crossing manner across the chute so that the relative voltage is effective between the two electrodes contacting the back of the leg or in a further instance, the electrode or electrodes can be mechanically coupled and movable relative to a floor so that the electrodes can in themselves be brought bare against the relative location of the legs of the sheep.

Some resiliency in the support of the electrodes will ensure that the variously positioned legs can be acted against by the respective electrodes coming forward.

The distance between the respective crossing electrodes in the preferred embodiment can be widely varied although in the preferred instance it is approximately 15 inches between respective leading edges of the electrodes.

What is claimed is:

1. An arrangement to assist in provoking forward movement of animals including a floor on which an animal is to walk, and at least one eletrode member located above the floor at a height between the hock and the hoof of the animal's leg, the member extending across the proposed forward path of the animal, and resilient insulation material above and extending forwardly of said electrode member, and a second electrode means in the adjacent vicinity of the said one electrode member and adapted to contact a further lower portion of a leg of the animal, and means connected between the electrodes to apply a substantial voltage therebetween, the arrangement being such that an animal will be liable to be provoked into forward movement by reason of the voltage upon contact with said electrodes.

2. An arrangement as in claim 1, in which the second electrode means comprises the floor on which the animal is to walk and such a floor is constituted by a conductive mesh.

3. Apparatus as in claim 2, in which said one electrode member is located approximately one and one-half inches above a floor on which the animals are to stand, and which is useful with any animal of a type having hooves.

4. An arrangement as in claim 1, in which the second electrode means comprises a conductive mesh floor on which the animal is to walk, and said insulation material is secured to said electrode member and completely covers the top surface of said electrode member.

5. Apparatus as in claim 4, in which said one electrode member has a surface exposed for contact by the animals moving forwardly on said floor, and said insulation material covers said one electrode member surface.

6. Apparatus for the provoking of forward movement of sheep, which apparatus comprises a race, an electrically conductive grid constituting the floor of the race, a plurality of transversely disposed electrodes along the race, each being positioned to provide a forwardly projecting portion at or about a height between the hock and the hoof of the rear of the sheep's leg, insulation means above each of the said electrodes such that the insulation means includes a resiliently supported forwardly projecting portion extending beyond the forwardmost portion of each of the respective electrodes, and such insulation means being arranged so that with a sheep backing its leg into the electrode, the insulation means will normally deflect to allow contact of the electrode with the rear portion of the leg between the hock and the hoof, means to provide a sufficient voltage difference between the said floor grid and each of the said electrodes to effect forward movement provocation of the sheep, and means to selectively apply such voltage difference between the respective electrodes and the floor.

7. Apparatus as in claim 6, in which each of said electrodes is located approximately one and one-half inches above said floor.

8. The method for the provoking of forward movement of sheep along a race having an electrically conductive floor comprising the steps of providing a plurality of transversely disposed electrodes along the race, each having a contact portion at a height above the floor of between the sheep's leg hock and the lower surface of the sheep's hoof, insulating each of the said electrodes to prevent contact therewith by a sheep's leg by forward and/or downward movement of a sheep's leg, moving the insulation to expose the electrode by a sheep backing towards the electrode, and shocking the sheep to effect forward movement provocation of the sheep when a sheep backs into any such electrode.

9. The method for the provoking of forward movement of sheep along a race having an electrically conductive floor comprising the steps of providing a plurality of transversely disposed insulated electrodes along the race at a height above the floor of between the sheep's leg hock and the lower surface of the sheep's hoof, the insulation preventing contact with the electrode by a sheep's leg by only forward and/or downward movement, and shocking the sheep to effect forward movement provocation of the sheep when a sheep backs into any such electrode.

* * * * *